United States Patent
Byrne

[11] Patent Number: 5,259,694
[45] Date of Patent: Nov. 9, 1993

[54] PERSONAL WATERCRAFT LAUNCHER

[76] Inventor: David J. Byrne, 1649 Daws Rd., Blue Bell, Pa. 19422

[21] Appl. No.: 710,399

[22] Filed: Jun. 5, 1991

[51] Int. Cl.$^5$ .............................................. B63B 23/02
[52] U.S. Cl. .......................................... 405/4; 405/2; 405/7
[58] Field of Search ........................... 114/44, 45, 263; 405/1-7; 193/35 R, 35 SS, 35 TE, 37; 104/245, 246, 135; 414/678, 477, 478; 280/414.1; 410/2

[56] References Cited

U.S. PATENT DOCUMENTS

| | | | |
|---|---|---|---|
| 1,373,754 | 4/1921 | Miller | 104/246 |
| 2,389,338 | 11/1945 | Zorc | 405/1 X |
| 2,910,197 | 10/1959 | Beckner | 414/477 |
| 3,265,450 | 8/1966 | Aho | 104/135 X |
| 3,802,354 | 4/1974 | Bateson et al. | 104/135 X |
| 4,015,879 | 4/1977 | Shonkwiler | 414/477 X |
| 4,507,016 | 3/1985 | Honour | 405/2 |
| 4,865,339 | 9/1989 | Rundborg et al. | 414/477 X |

FOREIGN PATENT DOCUMENTS 2046181  11/1980  United Kingdom ..................... 405/1

Primary Examiner—Dennis L. Taylor
Assistant Examiner—John A. Ricci
Attorney, Agent, or Firm—Armand M. Vozzo, Jr.

[57] ABSTRACT

An improved personal watercraft launcher is disclosed having a deployable carriage mounted upon a dock surface and movable in a guided path between a stowed and deployed position. A cradle assembly affixed to the dock surface near to the water is equipped with a pair of opposed rollers inwardly directed to engage open channels of longitudinal rails on each side of the carriage. Guided by the roller engagement of the side rail channels and limited in travel by roller stops fixed along the side rails, the carriage is moved longitudinally through the cradle assembly along the dock surface from its stowed position with the watercraft carried directly upon adjustable support members secured to the carriage. As the carriage is moved longitudinally, the forward end thereof extends over the edge of the dock surface and, under continued roller engagement of the side rails, the carriage pivots about the rollers into the deployed position wherein the carriage is inclined in the water and retained to the dock surface within the cradle assembly for loading and unloading of the watercraft assisted by a winch mechanism secured atop the rearward end of the carriage.

19 Claims, 4 Drawing Sheets

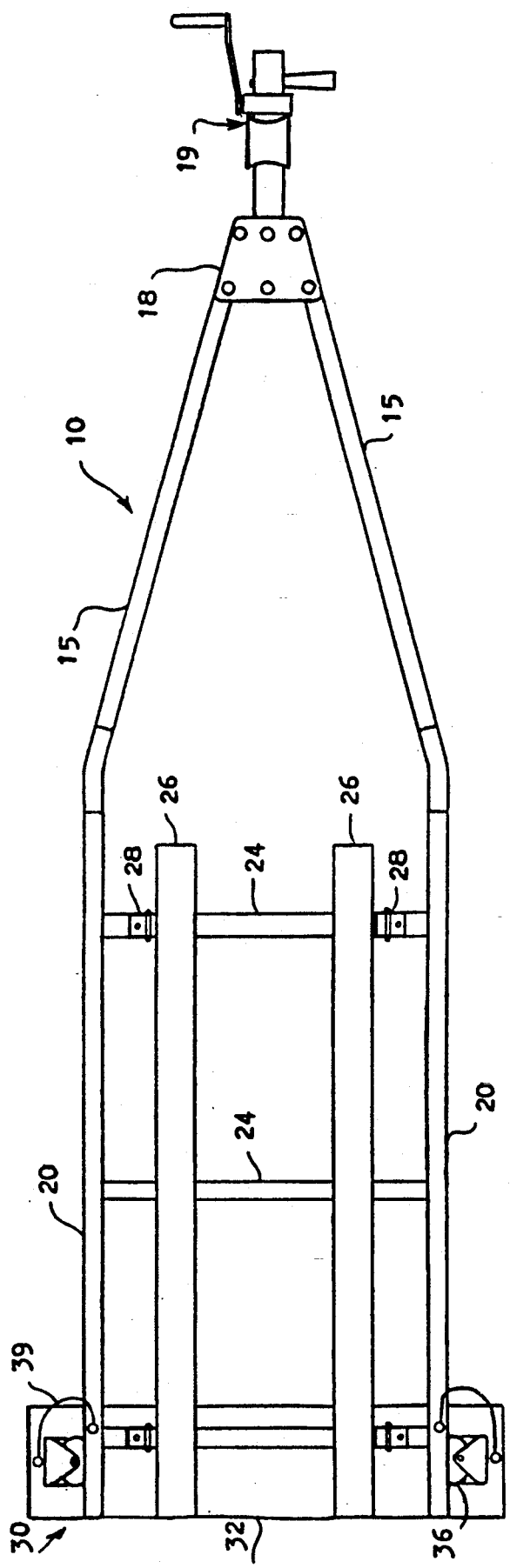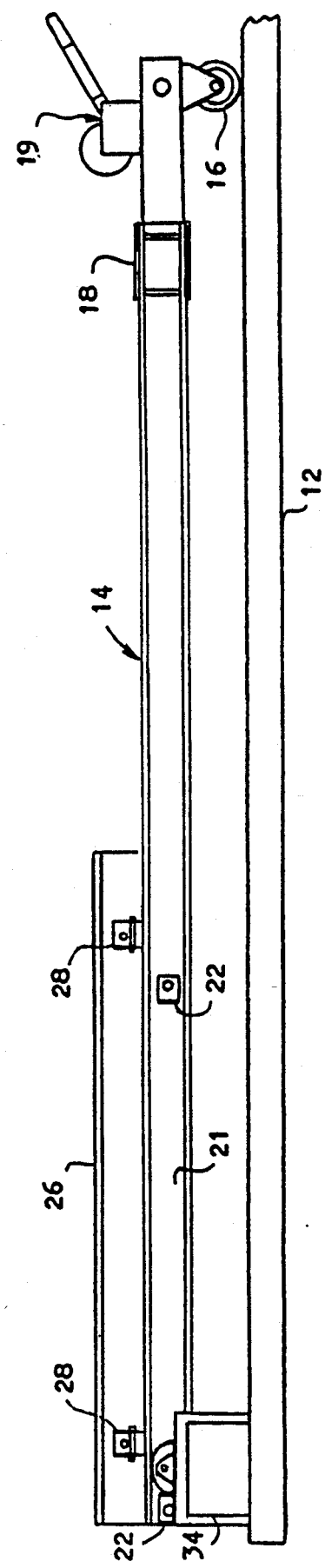

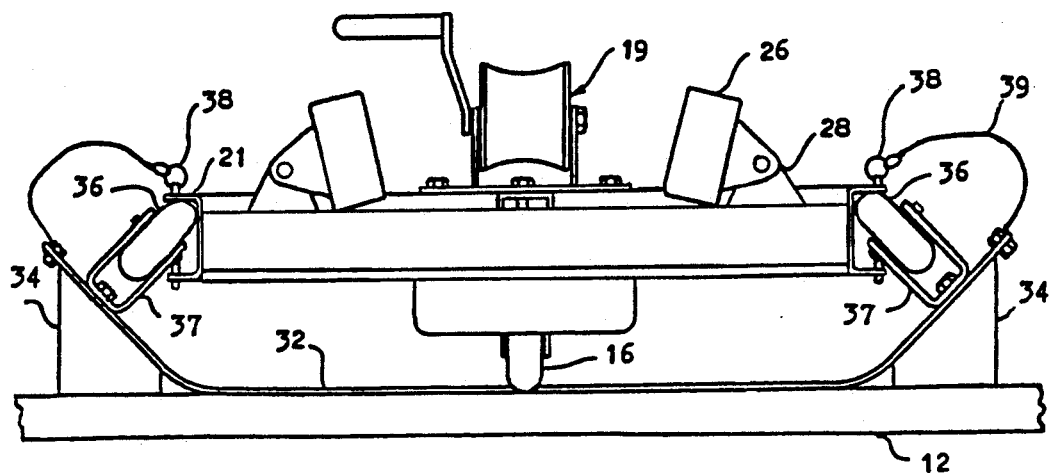
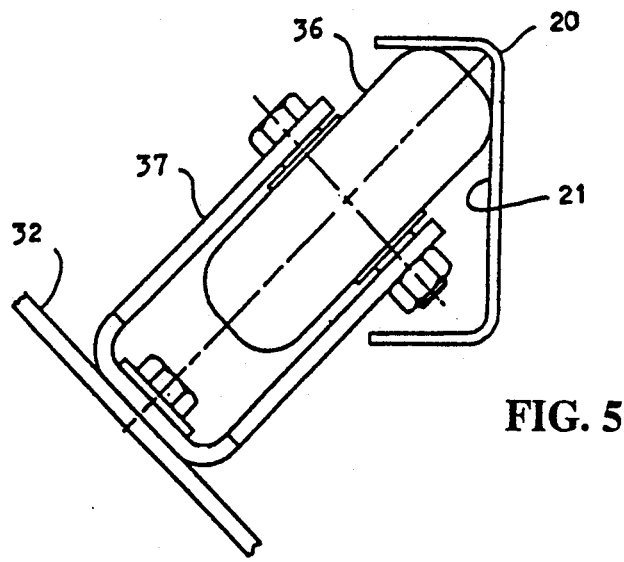
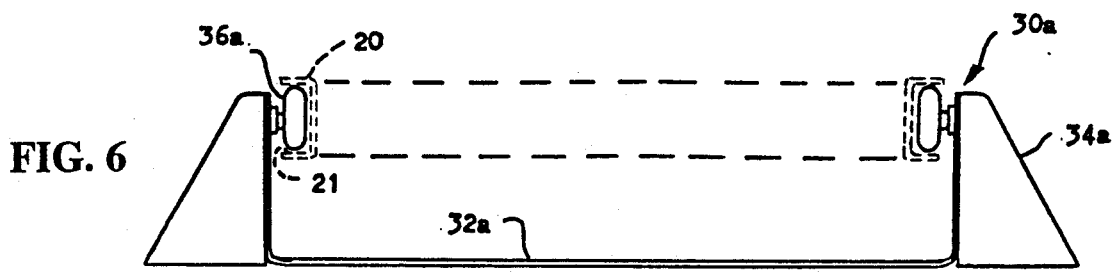

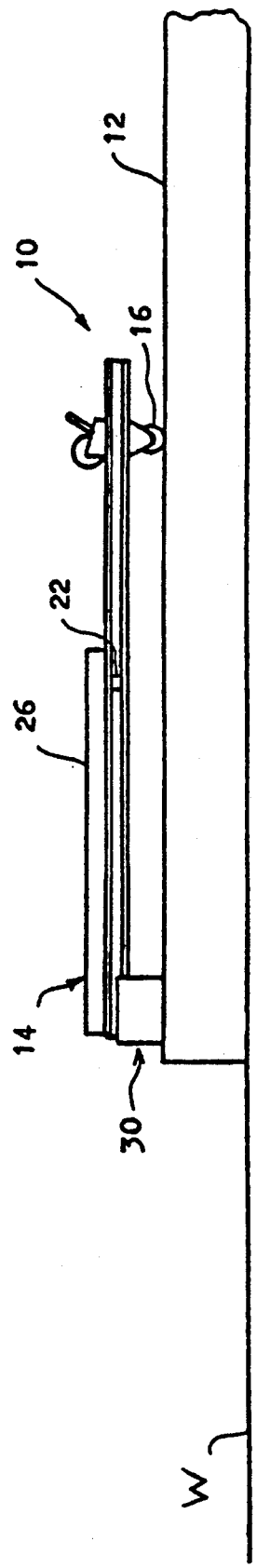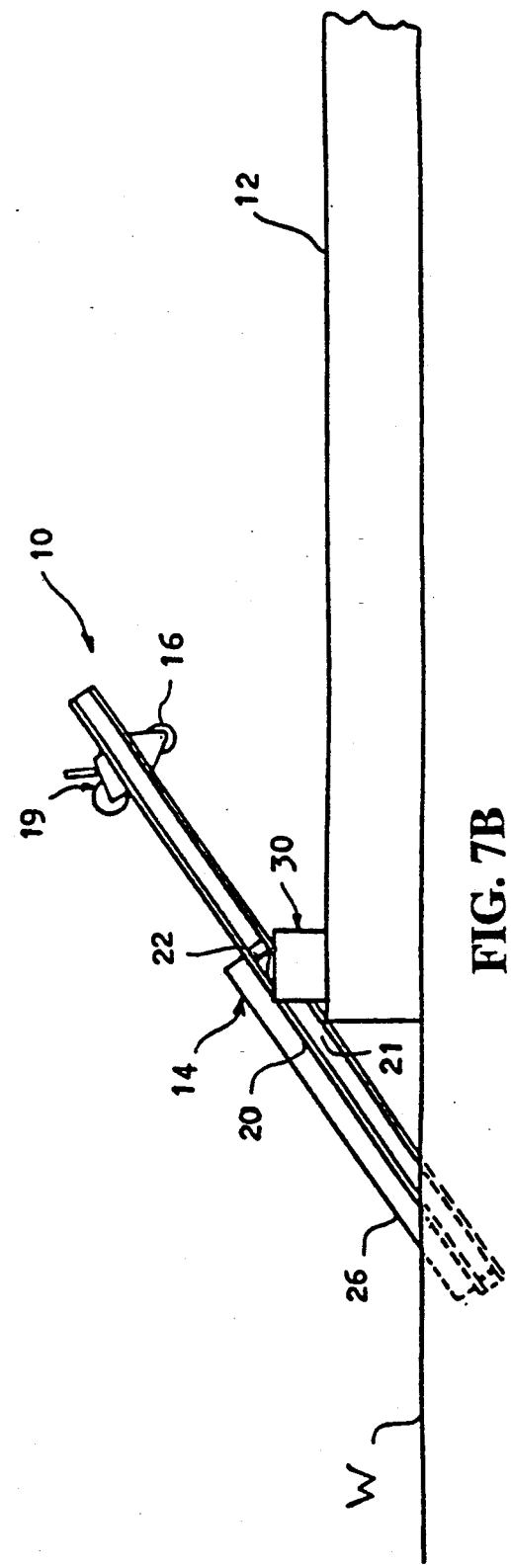

PERSONAL WATERCRAFT LAUNCHER

BACKGROUND OF THE INVENTION

The present invention relates to systems for launching of boats or like vessels into a body of water, and more particularly, to an improved launching device for personal-sized watercraft having a movable carriage that is deployable from a floating dock surface with its longitudinal and rotational travel guided and contained by intercoupling with the dock surface.

Motorized personal watercraft, such as so-called jet skis and the like, have become quite popular for recreational use. While being relatively small in size, typically 7 to 9 feet in length, these personal watercraft are quite bulky due to the motor and associated components contained thereon and as a result, they become difficult for the individual to move into and out of the water. Launching and retrieval of these watercraft from a dry or floating dock is especially difficult, if not impossible, without risk of damage to the watercraft as well as to the dock.

Numerous types of systems for launching and retrieval of boats have been designed and developed, typically being characterized by a pivotable loading ramp mounted upon an elevated support with a winch or other means for pulling the boat up, or lowering the boat down, the ramp. Such prior art ramps generally pivot from a substantially horizontal position to an inclined position for delivering the boat directly into the water upon launching. The pivotal motion is reversed upon retrieval so that when the boat is hauled a certain distance up the ramp, the ramp returns to the substantially horizontal position wherein the boat is supported on the dock for storage purposes. Other types of prior art launching systems employ a moveable carriage for supporting the boat that slides or rolls longitudinally along a flat surface to and from the water further pivoting at some point, like those prior art ramp devices, to tilt its structure for water entry.

While these prior art systems have been generally effective in boat-launching and retrieval, their construction and adaptation for use upon floating dock surfaces has suffered certain limitations which have discouraged their general acceptance especially in the handling of personal watercraft. For instance, ramp systems have generally been either too complicated and thus expensive or too simple and as a result, unable to provide smooth and efficient operation on a regular basis. Further, while many ramp systems require permanent installation to be most effective, the installations heretofore have been difficult and costly to make. Prior art carriage systems have experienced much the same difficulties as those of existing ramp systems with additional problems generally occurring in the control and containment of the travel and rotation of the carriage upon entering and leaving the water.

SUMMARY OF THE INVENTION

Accordingly, it is a general purpose and object of the present invention to provide an improved boat-launching device, particularly useful for handling personal-sized watercraft, that operates smoothly and efficiently from a floating dock surface.

Another object of the present invention is to provide a personal watercraft launcher capable of storing the watercraft upon a floating dock and of being deployed therefrom without disengaging the dock so that launching and retrieval of the watercraft may be effected on a regular basis.

Still another object of the present invention is to provide a launching device for personal-sized watercraft that may be permanently installed upon a floating dock in a relatively easy manner and maintained in operating condition thereon with minimal effort and expense.

A still further object of the present invention is to provide an improved personal watercraft launcher that is easy and inexpensive to manufacture, assemble and mount yet safe and reliable in performance.

Briefly, these and other objects of the present invention are accomplished by an improved personal watercraft launcher having a deployable carriage mounted upon a dock surface and movable in a guide path between a stowed and deployed position. A cradle assembly affixed to the dock surface near to the water is equipped with a pair of opposed rollers inwardly directed to engage open channels of longitudinal rails on each side of the carriage. Guided by the roller engagement of the side rail channels and limited in travel by roller stops fixed along the side rails, the carriage is moved longitudinally through the cradle assembly along the dock surface from its stowed position with the watercraft carried directly upon adjustable support members secured to the carriage. As the carriage is moved longitudinally, the forward end thereof extends over the edge of the dock surface and, under continued roller engagement of the side rails, the carriage pivots about the rollers into the deployed position wherein the carriage is inclined in the water and retained to the dock surface within the cradle assembly for loading and unloading of the watercraft assisted by a winch mechanism secured atop the rearward end of the carriage.

For a better understanding of these and other aspects of the present invention, reference may be made to the following detailed description taken in conjunction with the accompanying drawings in which reference numerals and letters are used to designate various elements of the invention.

BRIEF DESCRIPTION OF THE DRAWING

FIG. 2 is a plan view of the inventive launcher of FIG. 1;

FIG. 3 is a side elevation of the personal watercraft launcher of FIG. 2 shown in its stowed position on a dock surface;

FIG. 4 is a front elevation of the inventive launcher shown in FIG. 3;

FIG. 5 is an expanded view of the roller engagement between the cradle assembly and carriage of the personal watercraft launcher as shown in FIG. 4;

FIG. 6 is an alternate embodiment of a cradle assembly for the inventive launcher; and FIGS. 7A and 7B are schematic side views of the personal watercraft launcher showing the relative movement of the carriage within the cradle assembly in the stowed and deployed positions.

DESCRIPTION OF THE PREFERRED EMBODIMENT

Figure 1:
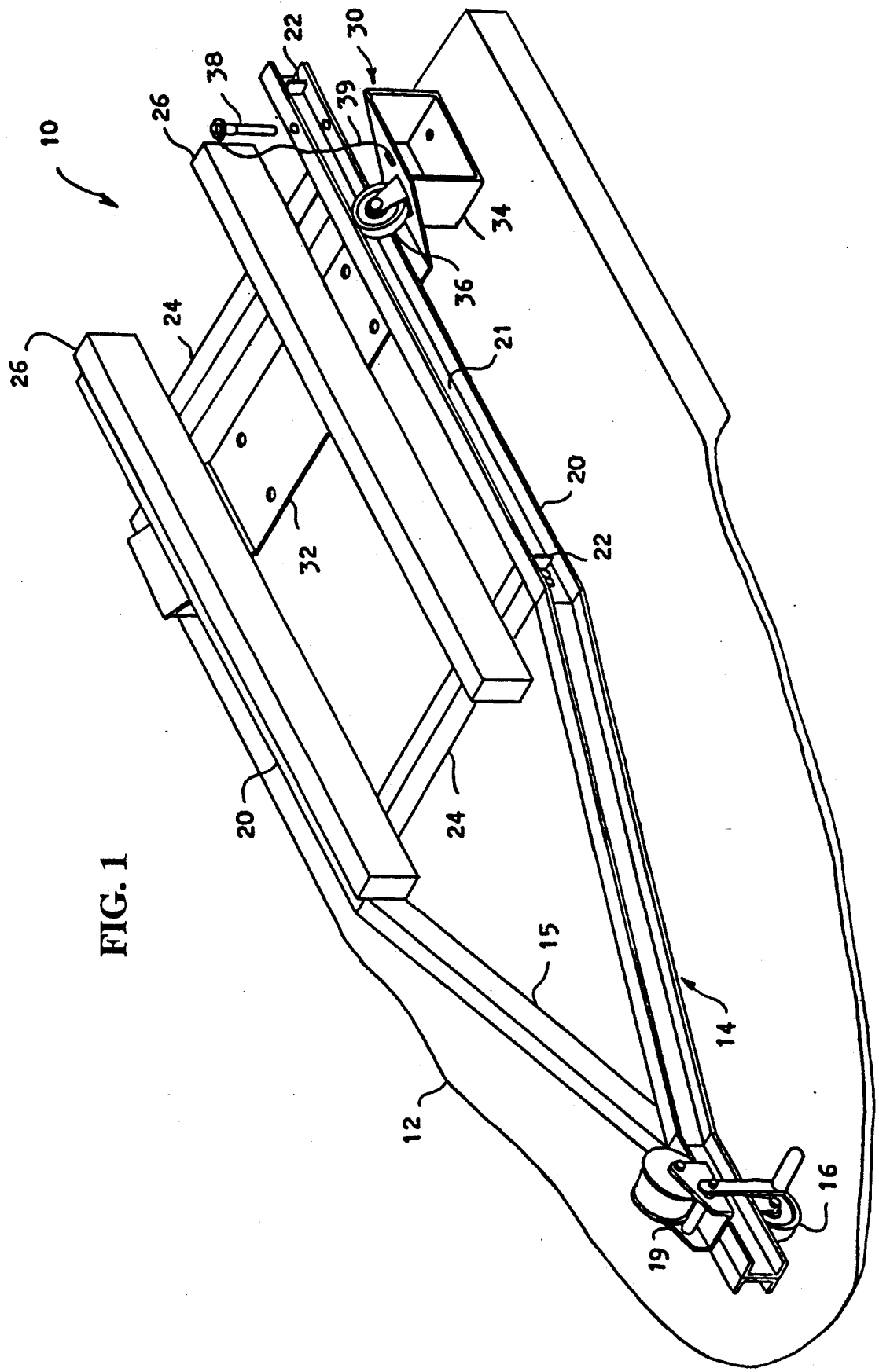
FIG. 1 is perspective view of the personal watercraft launcher according to the present invention shown in its stowed position.

Referring now to FIGS. 1-3, a launcher 10 useful in launching and retrieving a personal-sized watercraft (not shown), such as a jet ski or the like, is shown mounted upon a floating dock surface 12 and ready for deployment with respect to a body of water. In accordance with the present invention, launcher 10 comprises a carriage 14 having a rigid frame construction which includes a bifurcated section 15 extending a portion of the length of the carriage and a pair of substantially parallel side rails 20 connected to respective open ends of the bifurcated section. Typically constructed of a set of individual frame members, section 15 is joined at its closed end to provide its bifurcated configuration using a support plate 18 attached above and below the frame of carriage 14. The carriage 14 is provided with a wheel member 16 mounted beneath its frame at the closed end of bifurcated section 15 to permit rolling movement of the carriage in a longitudinal direction. A conventional winch mechanism 19 is further provided the carriage 14 and mounted atop the closed end of bifurcated section 15 for assisting in the launching and retrieval operations of the watercraft as described in greater detail hereinbelow.

Side rails 20 of the launcher 10 are rigid members each having an open channel 21 formed along its length. Each channel 21 of side rail 20 is formed having a substantially rectangular configuration, as better seen in FIGS. 4 and 5, and is made to face outwardly of the carriage 14 in order to engage a cradle assembly 30 and allow travel of the carriage therethrough, as described in greater detail hereinbelow. A pair of rail stops 22 are affixed to each side rail 20 within its respective channel 21 to close the ends thereof and contain the engagement of the cradle assembly 30 thereby limiting the travel of the carriage 14.

A series of transverse members 24 are spaced apart from each other and connected at their respective ends between the side rails 20 to provide structural support to the carriage 14 and the watercraft carried thereon. A pair of support bunks 26 aligned substantially in parallel to each other internally of the side rails 20 are mounted in adjustable positions upon the transverse members for carrying personal watercraft of different types and sizes during storage and operation of launcher 10. The support bunks 26 are mounted upon the transverse members 24 via pivotable couplings 28 that permit the bunks to swing inwardly and outwardly thereby adapting to engage varied types and sizes of watercraft. The surfaces of each support bunk 26 are preferably covered and cushioned to protect those portions of the watercraft brought to rest upon the bunks and directly carried thereon during storage and handling.

Launcher 10 further comprises a cradle assembly 30 which is mounted directly to the dock surface 12, preferably near to or along the edge thereof, and which, in its mounted position, engages carriage 14 along its side rails 20 so that movement of the carriage is guided and contained upon the dock surface. The cradle assembly 30 includes a cradle plate 32 which has a substantially flat middle section extending laterally beneath carriage 14 across the dock surface 12 and attached thereto. The cradle plate 32 is further formed having elevated portions that rise to an angled position relative to the dock surface 12 on either side of the flat middle section and to the outside of the width of carriage 14. Angled blocks 34 positioned beneath each of the elevated portions of cradle plate 32 and secured to the dock surface 12 provide support to its angled position. A pair of guide rollers 36 are mounted on opposite sides of the cradle assembly 30, each roller being secured to the elevated portion of the cradle plate 32 via a mounting bracket 37 so that the rollers are inwardly directed for engagement with carriage 14 with their movement restricted except for rotation in the plane of each roller. The inwardly directed rollers 36 engage each side rail 20 of carriage 14 along respective open channels 21 and thus rotate freely within the channels limited by the rail stops 22 near each end thereof. The rollers 36 are preferably made of a rigid, high-strength material that is non-reactive with the water environment and are sized to fit the channel 21 of side rail 20 according to its engaged position as described hereinbelow. A locking pin 38 is preferably tethered via line 39 to the elevated portion of cradle plate 32 on either side of carriage 14 and is adapted to engage aligned holes in each side rail 20 near the forwardmost rail stop 22 to further confine rotational movement of the rollers 36 within the channels 21, particularly locking the carriage in its stowed position shown particularly in FIGS. 2 and 3.

Referring now to FIGS. 4 and 5, the engagement of rollers 36 within the respective channels 21 of side rails 20 is best viewed in the preferred embodiment of launcher 10. Each roller 36 is mounted within bracket 37 having a fixed plane of rotation substantially perpendicular to the plane of the elevated portion of plate 32. In this angular position, typically about 45° relative to the dock surface 12, roller 36 engages side rail 20 in the upper corner of channel 21 so that the surface of the roller is in intimate contact with both the top and facing surface of the channel. The rotational movement of rollers 36 engaged in this position within opposite channels 21 allows the side rails 20 to travel freely back and forth upon the rollers in a guided longitudinal path between rail stops 22. The forwardmost stops 22 block rollers 36 on both sides of the cradle assembly 30 and limit rearward movement of carriage 14 to establish the stowed position of launcher 10. Rearwardmost rail stops 22, on the other hand, prevent further forward movement of the carriage 14 upon the rollers 36 but allow the carriage to rotate forwardly upon the rollers to establish the deployed position of launcher 10.

An alternate construction of cradle assembly 30a appropriate for use with the present invention is illustrated in FIG. 6. In this alternate cradle assembly 30a, a cradle plate 32a is formed having a substantially flat middle section similar to the previously described cradle plate 32 but having an elevated section that is substantially perpendicular to the middle section on each side thereof and thus normal to the dock surface 12 on which cradle plate 32a is mounted. Angled blocks 34a further attached to the dock surface 12 in support of the elevated section of cradle plate 32a are formed to abut the elevated section on each side of the cradle plate and be firmly attached thereto for maintaining the essentially rectangular configuration of the cradle plate 32a. Rollers 36a, similar in fabrication to those described above, are inwardly mounted near the top of the opposite elevated sections of cradle plate 32a so that their respective planes of rotation are generally parallel to each other and perpendicular to the dock surface 12. Oppositely mounted in this parallel fashion and sized to fit completely within the channels 21 of side rails 20, rollers 36a rotate freely within the channels as the carriage 14 moves back and forth thereupon and stay retained therein between rail stops 22. Stowed and deployed positions of the carriage 14 are thus similarly established as in the angled construction of cradle assembly 30 above, with the forward rotation of the carriage into its deployed position being similarly effected by the interaction of the rearwardmost rail stop 22 and roller 36a within each side rail 20.

With particular reference to FIGS. 7A and 7B in conjunction with the previous FIGS. 1-6, the operation of the launcher 10 can now be summarized. In the stowed position of FIG. 7A, carriage 14, with or without a watercraft supported thereon, is stationed substantially horizontal on the dock surface 12 resting within cradle assembly 30 at its forward end and upon wheel member 16 at the rearward end of the carriage. In this position, the rollers 36 are engaged within the channels 21 of side rails 20 and abutting the forwardmost rail stops 22 affixed therein. Locking pins 38 may be engaged within the side rails 20 to confine movement of the carriage 14 upon the rollers 36 and thereby maintain the stowed position of the carriage when deployment of the launcher 10 is not imminent. Any watercraft supported upon the carriage 14 in this stowed position and intended for launching would typically be connected to winch mechanism 19 to assist the launching operation.

With the locking pins 38 removed from side rails 30, carriage 14 may be moved forward along the dock surface 12 and rotated into its deployed position, as shown in FIG. 7B. As the carriage 14 is initially deployed, it travels forward atop wheel member 16 engaged within and guided by the cradle assembly 30, particularly via the rotational engagement of the rollers 36 inwardly directed within the channels 21 of respective side rails 20. When the forward portion of the carriage 14 has passed through the cradle assembly 30 and extended over the edge of the dock surface 12, the carriage is rotated forward toward the water surface W either manually or under the weight of the watercraft. The forward rotation of carriage 14 is effected and contained by the pivotal motion of the side rails 20 about the rollers 36 respectively engaged therein and abutting to rearwardmost rail stop 22. In the deployed position, carriage 14 is inclined relative to the dock surface 12 and retained thereto within the cradle assembly 30, with the forwardmost portion of the carriage penetrating the water surface W for either loading or unloading of watercraft assisted by the winch mechanism 19.

Therefore, it is apparent from the above description of the launcher and the teachings hereof that the present invention provides an improved boat-launching device, particularly useful in handling personal watercraft, that operates from a floating dock surface in a smooth and efficient manner. By means of the contained roller engagement between the carriage 14 and cradle assembly 30, the present invention provides a personal watercraft launcher capable of storing the watercraft upon a floating dock and of being deployed therefrom without disengaging the dock so that launching and retrieval of the craft may be effected on a regular basis without damage to the dock. In addition, the present invention provides a launcher for personal watercraft that may be permanently installed upon the dock in a relatively easy manner and maintained in operating condition with minimal effort and expense. Furthermore, the present invention provides an improved watercraft launcher that is easy and inexpensive to manufacture, assemble and mount yet that is safe and reliable in performance.

Obviously, other embodiments and modifications of the present launcher will readily come to those of ordinary skill in the art having the benefit of the teachings presented in the foregoing description and drawings. It is therefore to be understood that various changes in the details, materials, steps, and arrangements of parts, which have been described and illustrated to explain the nature of the invention, may be made by those skilled in the art within the principle and scope of the invention as expressed in the appended claims.

What is claimed is:

1. A device for launching a watercraft into a body of water from a dock surface, comprising:
    a carriage member adapted to travel along the dock surface, said carriage member including longitudinal rail means having open channels formed along a predetermined length thereof and outwardly facing said carriage member;
    cradle means adapted to be mounted across the dock surface transversely to said carriage member for rotatably coupling said carriage member to the dock surface, said cradle means including opposed roller members inwardly directed to engage respective open channels of said longitudinal rail means so that said carriage member is guided in longitudinal and rotational travel upon the dock surface; and
    a set of rail stops attached to and spaced apart within the open channels of said longitudinal rail means to interact with said roller members and thereby limit travel of said carriage member.

2. A launching device according to claim 1, wherein said cradle means further comprises:
    a plate member formed having a substantially flat middle section and a pair of elevated portions respectively positioned on either side of said middle section at similar angles relative thereto; and
    said roller members being respectively mounted to the elevated portions of said plate members on opposite sides of the middle section to inwardly face each other and engage respective open channels of said longitudinal rail means.

3. A launching device according to claim 2, wherein:
    said roller members are respectively mounted to the elevated portions of said plate member having an inclined plane of rotation substantially perpendicular to the elevated portion for intimately engaging upper corners of the open channels of said longitudinal rail means.

4. A launching device according to claim 2, wherein:
    said elevated portions of said plate member are positioned substantially perpendicular to said middle section on each side thereof; and
    said roller members are respectively mounted to the elevated portions of said plate member having substantially parallel planes of rotation for intimately engaging the top surface of the respective open channels of said longitudinal rail means.

5. A launching device according to claim 4, wherein said carriage member further comprises:
    locking means coupled to said longitudinal rail at a forwardmost one of said rail stops to hold said roller members in a position abutting said forwardmost rail stop thereby maintaining said carriage member in a position upon the dock surface.

6. A launching device according to claim 1, wherein said carriage member further comprises:
    support means pivotally coupled to said longitudinal rail means to hold the watercraft upon said carriage member.

7. A watercraft launcher deployable from a dock surface, comprising:

a carriage member adapted to be coupled to the dock surface and movable thereon between a stowed and a deployed position, said carriage member comprising a longitudinal frame having a pair of substantially parallel side rails each formed to provide an open channel externally facing said carriage member along a predetermined length;

a cradle member adapted to be mounted directly upon the dock surface transversely to the longitudinal frame of said carriage member and formed having a pair of roller members disposed thereon to rotatably engage said carriage member along the channel length of said side rails and guide movement of said carriage member between the stowed and deployed positions upon the dock surface; and a pair of rail stops attached to and spaced apart within each open channel to interact with said roller members and thereby limit travel of said carriage member.

8. A watercraft launcher according to claim 7, wherein said cradle member comprises:

a plate formed having a substantially flat middle section and a pair of elevated portions respectively positioned on either side of said middle section and made to project therefrom at similar angles relative thereto; and said pair of roller members respectively mounted to the elevated portions of said plates on opposite sides of the middle section to inwardly engage respective open channels of said side rails.

9. A watercraft launcher according to claim 8, wherein:

said roller members are mounted to the elevated portions of said plate member having an inclined plane of rotation substantially perpendicular to the angle of the elevated portion for intimately engaging upper corners of the open channels of said side rails.

10. A watercraft launcher according to claim 8, wherein:

said elevated portions of said plate member are positioned substantially perpendicular to said middle section on each side thereof; and said roller members are mounted to the elevated portions of said plate member having substantially parallel planes of rotation for intimately engaging the top surface of the respective open channels of said side rails.

11. A watercraft launcher according to claim 8, wherein said carriage member further comprises:

locking means coupled to said side rails at a forwardmost one of said rail stops to hold said roller members in a position abutting said forwardmost rail stop thereby maintaining said carriage member in the stowed position.

12. A launching device according to claim 7, wherein said carriage member further comprises:

bunk supports pivotally coupled to the longitudinal frame and mounted internally of said side rails to hold the watercraft upon said carriage member.

13. A device for launching and retrieving of personal watercraft from a dock surface, comprising:

carriage means for supporting the watercraft including a longitudinal frame movable upon the dock surface and formed having a rail means with open channels along a certain length thereof;

cradle means adapted to be mounted upon the dock surface transverse to said longitudinal frame and formed having a pair of roller members for rotatably engaging said longitudinal frame inwardly along the open channel lengths to retain said carriage means upon the dock surface during movement of said longitudinal frame relative thereto; and a pair of rail stops attached to and spaced apart within the open channels to interact with said roller members and thereby limit travel of said carriage member.

14. A launching and retrieving device according to claim 13, wherein said cradle means comprises:

a plate member formed having a substantially flat middle section and a pair of elevated portions respectively positioned on either side of said middle section and made to project at similar angles relative thereto; and said pair of roller members respectively mounted to the elevated portions of said plate members on opposite sides of the middle section to inwardly engage respective open channels of said rail means.

15. A launching and retrieving device according to claim 14, wherein:

said roller members are mounted to the elevated portions of said plate member having an inclined plane of rotation substantially perpendicular to the angle of the elevated portion for intimately engaging upper corners of the open channels of said side rail means.

16. A launching and retrieving device according to claim 14, wherein:

said elevated portions of said plate member are positioned substantially perpendicular to said middle section on each side thereof; and said roller members are respectively mounted to the elevated portions of said plate member having substantially parallel planes of rotation for intimately engaging the top surface of the respective open channels of said rail means.

17. A launching and retrieving device according to claim 14, wherein said carriage means further comprises:

locking means coupled to said rail means at a forwardmost one of said rail stops to hold said roller members in a position abutting said forwardmost rail stop thereby restricting movement of said carriage upon the dock surface.

18. A launching and retrieving device according to claim 17, wherein said carriage means further comprises:

support means pivotally coupled to the longitudinal frame to hold the watercraft upon said carriage means.

19. A launching and retrieving device according to claim 18, further comprising:

winch means coupled to the longitudinal frame of said carriage means for assisting in the launching and retrieving of the watercraft.

* * * * *